(12) United States Patent
Uchida

(10) Patent No.: US 6,324,297 B1
(45) Date of Patent: *Nov. 27, 2001

(54) SKIN PATTERN FEATURE EXTRACTING APPARATUS

(75) Inventor: Kaoru Uchida, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,720

(22) Filed: Jul. 27, 1998

(30) Foreign Application Priority Data

Jul. 28, 1997 (JP) .................................................. 9-215447

(51) Int. Cl.[7] .............................. G06K 9/36; G06K 9/42; G06K 9/46; G06T 3/40; G06T 3/60

(52) U.S. Cl. ......................... 382/125; 382/275; 382/296; 382/298

(58) Field of Search ................................. 382/124–127, 382/275, 277, 289, 293, 296, 298, 309, 305; 356/71; 340/5.53, 5.83; 902/316; 713/186

(56) References Cited

U.S. PATENT DOCUMENTS

| | | | |
|---|---|---|---|
| 3,976,982 | * | 8/1976 | Eiselen ............................... 340/172.5 |
| 5,490,246 | * | 2/1996 | Brotsky et al. ...................... 395/161 |
| 5,519,785 | * | 5/1996 | Hara ..................................... 382/124 |
| 5,524,161 | * | 6/1996 | Omori et al. ........................ 382/125 |
| 5,613,013 | * | 3/1997 | Schuette ............................... 382/124 |
| 5,644,689 | * | 7/1997 | Ban et al. ............................. 395/124 |
| 5,654,771 | * | 8/1997 | Tekalp et al. ........................ 348/699 |
| 5,703,958 | * | 12/1997 | Hara ..................................... 382/124 |

FOREIGN PATENT DOCUMENTS

| | | |
|---|---|---|
| 52-97299 | 8/1977 | (JP) . |
| 63-86083 | 4/1988 | (JP) . |
| 2-80953 | 3/1990 | (JP) . |
| 4-287287 | 10/1992 | (JP) . |
| 5-12415 | 1/1993 | (JP) . |
| 5-12417 | 1/1993 | (JP) . |
| 5-108805 | 4/1993 | (JP) . |
| 7-57092 | 3/1995 | (JP) . |
| 8-287255 | 11/1996 | (JP) . |

OTHER PUBLICATIONS

Endo, E., "Adobe Photoshop A to Z," BNN Corp., Initial Publication, 6th Printing, Jun. 30, 1993, pp. 150–151.

* cited by examiner

Primary Examiner—Leo Boudreau
Assistant Examiner—Brian P. Werner
(74) Attorney, Agent, or Firm—McGuireWoods LLP

(57) ABSTRACT

An original image is held in the image holder 11, and displayed on the image display 12 to be viewed by the operator. The operator inputs the angle of rotation and ratio of compression of an focal point of the original image for observing ridges more clearly. A perspective transforming unit 14 generates a result image according to corresponding perspective transformation (i.e., affine transformations), and a perspective transformed image display 15 displays the result image to the user. The operator does operations of manual plotting and manual tracing with reference to the result image. The result of the operations is inputted to and recorded in the manual input unit 16, and transformed in a feature data transforming unit 17 to feature data.

9 Claims, 7 Drawing Sheets

(1)

(2)

SKIN PATTERN FEATURE EXTRACTING APPARATUS

BACKGROUND OF THE INVENTION

The present invention relates to a skin pattern feature extracting apparatus for skin pattern images such as fingerprints, palmprints or ridge pattern of other parts of the body.

Skin patterns such as fingerprints or prints of other parts of the body (hereinafter represented by fingerprints), have features that they are "unique for each person" and "stay the same for his/her life time". Owing to these features of fingerprints, systems have been proposed and implemented for actual use, in which features of a scanned fingerprint image, such as shapes of ridges and positional relations of end points and bifurcations of the ridges known as minutiae, are extracted and matched with reference to enrolled fingerprint features for identifying persons. These systems are highly reliable. To obtain high identification accuracy in these systems, it is necessary to accurately extract positions of end points and bifurcations of ridges from the image.

However, by extracting the above features from the given scanned fingerprints, particularly those having poor quality for such reasons, as that it is a latent fingerprint, in an automated process, it is impossible to realize sufficient accuracy of identification. Therefore, it is necessary that an operator having rich experience displays a fingerprint image, having been read out by a scanner and digitized, on a display screen and input or correct with a mouse or like input means, positions of minutiae, which had not been able to be extracted or erroneously extracted in the automatic process. To support this operation, a "Fingerprint Feature Extraction Apparatus" is disclosed in Japanese Patent Laid-Open Publication No.5-35856. The disclosed apparatus has such functions as:

cutting out an instructed part from an input image including a fingerprint;

subjecting the instructed part to an image enhancing process; and correcting feature extraction according to instructions.

The images before and after the processes are displayed, thus permitting the above manual feature extraction to be supported. By using this apparatus, the operator does operations of "manual plotting", i.e., manually inputting position and direction data of end points and bifurcations by watching the display, and "manual tracing", i.e., manually tracing ridges and inputting the traces.

In many cases of the above manual feature extraction from fingerprints and prints of other parts of the body, when the image as the input image is poor in quality in that it is a latent fingerprint, when the imprint area of the finger print image is small, or when many wrinkles are superposed on an image of a hand skin pattern print image, ridge traces and minute features of end points and bifurcations of the ridges are mixed with noise and can not be clearly observed by the operator. FIG. 7 shows an example of such an image. In this case, although it is clearly seen that ridges extend together substantially in the horizontal direction, it is considerably difficult to determine the positions of end points and bifurcations. For this reason, even a skilled operator may make person identification with reduced accuracy due to position errors.

SUMMARY OF THE INVENTION

An object of the present invention is to provide a skin feature extracting apparatus, which permits, even with a traced image of poor quality, extracting such features as ridge traces and positions of end points and bifurcations buried in the traces, and improving the accuracy of personal identification.

According to the present invention, there is provided a skin pattern feature extracting apparatus for displaying skin pattern images, comprising: perspective transformation instruction input means for inputting operator's perspective transformation instructions thereto; perspective transforming means for perspective transforming a given image according to the inputted instructions; and perspective transformed image displaying means for displaying the result of the perspective transformation to the operator.

An extent of geometrical image compression of the image in a certain direction thereof and/or an angle of geometrical rotation of the image about a certain point is inputted to the perspective transformation instruction input means. The perspective transforming means executes affine transformation operations on an input image for geometrical image compression thereof in a certain direction and/or geometrical rotation thereof about a certain point.

According to another aspect of the present invention, there is provided a skin pattern feature extracting apparatus for displaying skin pattern images, comprising: focal point instruction input means for inputting operator's focal point instructions thereto; perspective transformation parameter determining means for determining the contents of perspective transformation from the character of an input image in the proximity of the instructed focal point; and perspective transforming means for executing the perspective transformation of the determined contents.

The perspective transformation parameter determining means determines an angle of geometrical rotation in the perspective transformation and/or an extent of geometrical image compression in the perspective transformation with reference to an instructed local image as an input.

The perspective transforming means executes affine transformation operations on the input image according to the rotation angle and compression extent determined by the perspective transformation parameter determining means. The skin pattern feature extracting apparatus further comprises feature data superimposing means for superimposing, on an original image, data of a feature automatically or manually extracted from the original image.

According to other aspect of the present invention, there is provided a skin pattern feature extracting apparatus comprising: image storage means for storing digitized input image; image display means for displaying the input image stored in the image storage means on a display screen; perspective transformation instruction input means for inputting an instruction of a desired perspective transformation of the displayed image; perspective transforming means for generating perspective transformed image by executing an affine transformation according to the data fed from the perspective transformation instruction input means; perspective transformed image display for displaying the perspective transformed image obtained in the perspective transforming means; manual input means, through manual plotting or manual tracing with reference to the perspective transformed image displayed on the perspective transformed image display, for inputting specified position feature data determined based on the manual plotting or manual tracing result to be stored; and feature data transforming means for transforming the stored specified position feature data to feature data for identification of a person in a skin pattern checker.

According still other aspect of the present invention, there is provided a skin pattern feature extracting apparatus comprising: image storage means for storing digitized input image; image display means for displaying the input image stored in the image storage means on a display screen; focal point instruction input means for inputting a position data of a local focal point; perspective transformation parameter determining means, receiving the position data from the focal point instruction input means, for determining perspective transformation parameter data for effectively clarifying the features of the local image area; perspective transforming means for generating perspective transformed image by executing an affine transformation according to the data fed from the perspective transformation parameter determining means; perspective transformed image display for displaying the perspective transformed image obtained in the perspective transforming means; manual input means, through manual plotting or manual tracing with reference to the perspective transformed image displayed on the perspective transformed image display, for inputting specified position feature data determined based on the manual plotting or manual tracing result to be stored; and feature data transforming means for transforming the stored specified position feature data to feature data for identification of a person in a skin pattern checker.

The skin pattern feature extracting apparatus further comprises a feature data superimposing unit for superimposing specified symbol on the original image. The specified position feature data is ridge and feature point position data.

By the term "perspective transformation" is meant one, which makes use of experimentally noted variations of the clarity of fine structures of skin pattern ridges observed in an image in a two-dimensional area, such as a photograph thereof placed in a two-dimensional space, i.e., on a desk, in dependence on the position of the viewpoint, from which the view is cast on the image, and permits a virtual image permitting clearer observation of the structures to be generated by varying the viewpoint positions.

Actually, the viewpoint position is not moved while holding the image stationary. Instead, the image is operated in three-dimensional space while holding the viewpoint stationary, thus realizing the same effect. It is experimentarily known that, compared to the case of observing the photograph of the image as shown in FIG. 7 horizontally, i.e., with vertical sight line, clearer observation of the structures in the neighborhood of the image center can be obtained by tilting the photograph by angle φ such that the right side of the photograph becomes closer to the operator and the left side further apart, and further by rotating the photograph about the center thereof by angle θ so that the ridges are observed on the upper limit. FIG. 8 shows an image which is obtained by tilting the original image shown in FIG. 7 through perspective transformation as noted above. According to the present invention, on the basis of this experiment results of an appropriate perspective transformation process are displayed to facilitate the visual recognition of ridge structures by the operator using the apparatus.

The operator manually plots feature points or manually traces ridges (on the original image, for instance) by having reference to the perspective transformed image, which is displayed in addition to the original image display.

By having reference to the result of perspective transformation (i.e, affine transformation), the visual recognition of ridge traces in poor quality original images, which were difficult to be clearly observed, can be improved. It is thus possible to permit plotting of positions of end points and bifurcations of ridges and tracing of ridges as unique features in the flow permitting readier recognition more accurately compared to the prior art.

The improvement of the accuracy of plotting and tracing permits improvement of the accuracy of the check, and improvement of the readiness of inputting permits alleviating the operator's burden and improving the productivity of processing.

Other objects and features will be clarified from the following description with reference to attached drawings.

PREFERRED EMBODIMENTS OF THE INVENTION

Preferred embodiments of the present invention will now be described will now be described with reference to the drawings.

Figure 1:
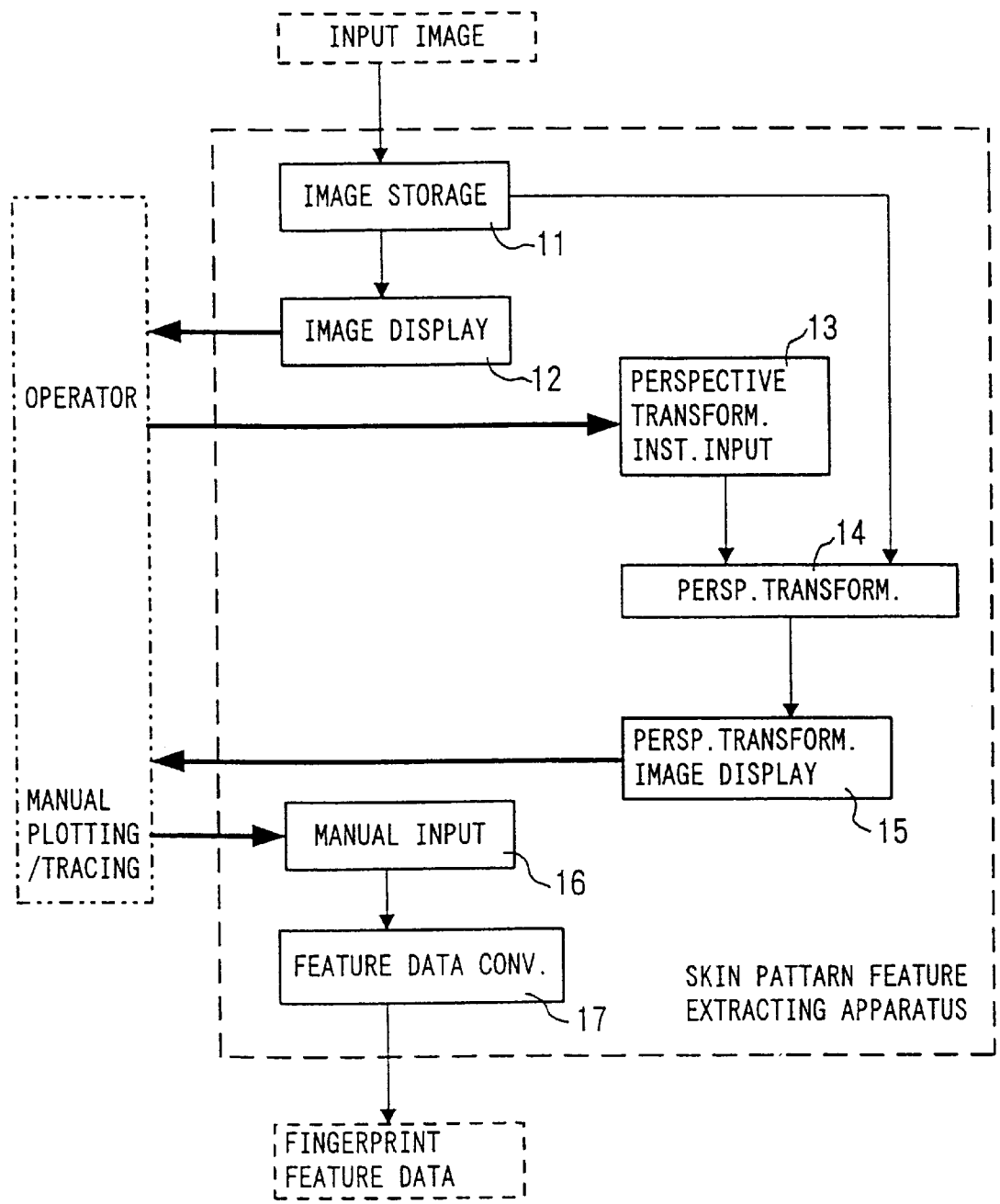
FIG. 1 shows a block diagram of a skin pattern feature extracting apparatus according to a first embodiment of the present invention.

Referring to FIG. 1, a first embodiment of the skin pattern feature extracting apparatus according to the present invention is shown, which comprises an image storage 11, an image display 12, a perspective transformation instruction input unit 13, a perspective transforming unit 14, a perspective transformed image display 15, a manual input unit 16 and a feature data transforming unit 17.

The image storage 11 holds digitized input image. The image display 12 displays the input image held in the image storage 11 on its display screen viewed by the operator.

The operator inputs instructions of a desired perspective transformation of the displayed image to the perspective transformation instruction input unit 13.

Figure 2:
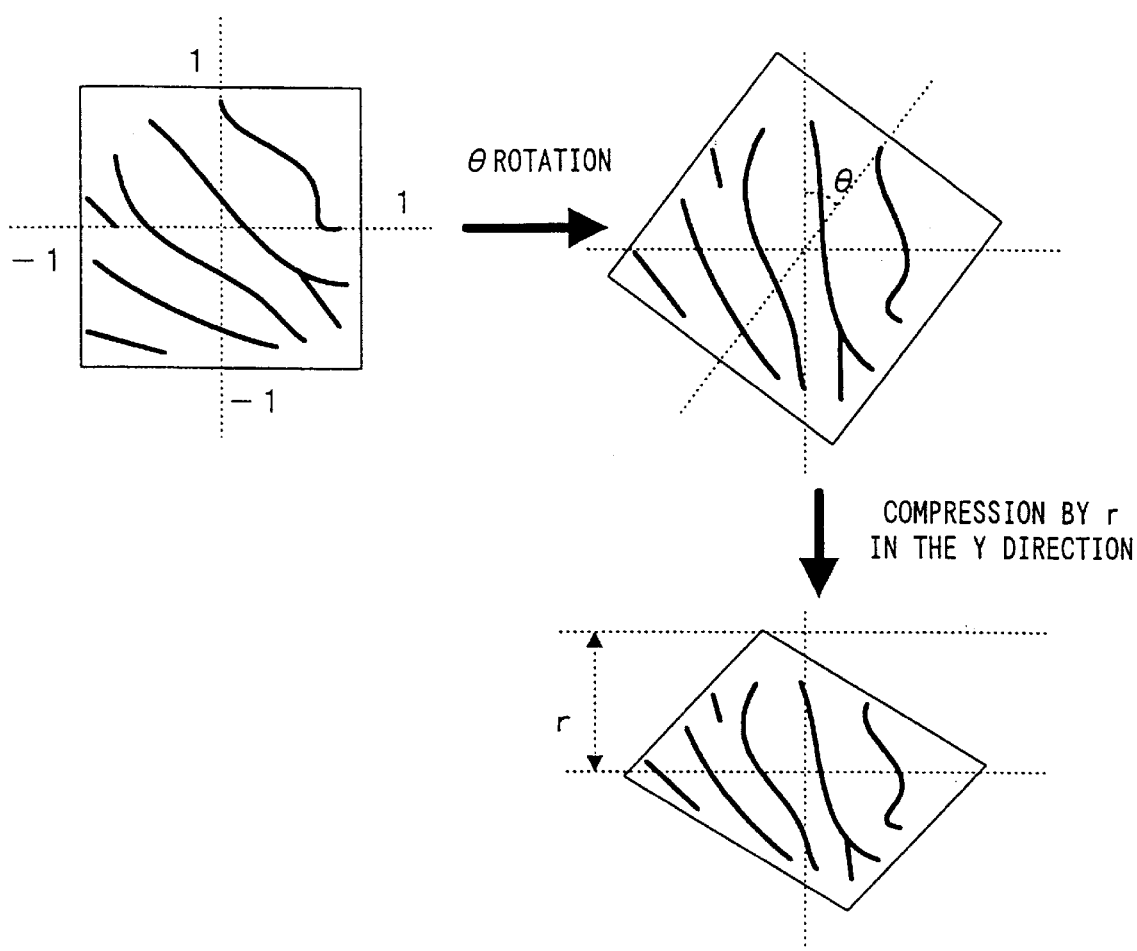
FIG. 2 shows images for explaining the perspective transformation in the first embodiment.

To obtain the effect of the perspective transformation as described above, the operator inputs parameter data corresponding to inclination angle φ and rotation angle θ of a given image to the apparatus, and the apparatus may generate a corresponding resultant imaginary image and display this image to the operator. For example, a result image of the perspective transformation for making the image center neighborhood clearer as described above, is obtainable through two affine transformations, i.e., 1. rotating the image by angle θ so that the horizontal direction of the original image, which is the direction of ridges in the image center neighborhood, is the vertical direction of the resultant image, and 2. compressing the resultant image in Y direction, i.e., the vertical direction, by r=cos θ (0<r ≦1). FIG. 2 illustrates this process.

Denoting the density distribution of the original image by f(x, y) (0≦x<X, 0≦y<Y), X and Y being the image sizes in X and Y directions), after the affine transformations of rotating the image (x, y) by angle θ and then vertically compressing the resultant image by ratio r, the coordinates (x', y') of the resultant image are expressed as:

$$\begin{pmatrix} x' \\ y' \end{pmatrix} = \begin{pmatrix} 1 & 0 \\ 0 & r \end{pmatrix} \begin{pmatrix} \cos\theta & -\sin\theta \\ \sin\theta & \cos\theta \end{pmatrix} \begin{pmatrix} x \\ y \end{pmatrix} = \begin{pmatrix} \cos\theta & -\sin\theta \\ r\sin\theta & r\cos\theta \end{pmatrix} \begin{pmatrix} x \\ y \end{pmatrix} \quad (1)$$

The apparatus thus may perform this process.

Figure 3:
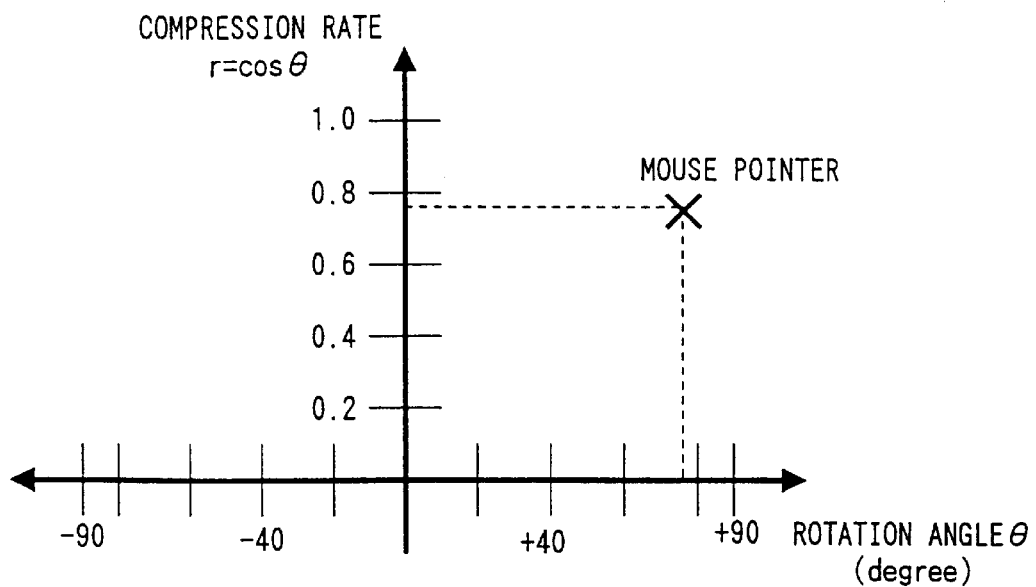
FIG. 3 shows a drawing for explaining the input image for the perspective transformation instruction input unit 13.

FIG. 3 shows a display screen, which serves as part of display used when the operator inputs the parameter data to the perspective transformation instruction input unit 13. In this case, the ordinate represents the compression ratio r corresponding to the inclination angle, and the abscissa represents the rotation angle θ. The rotation angle θ and the compression ratio r can be specified to the perspective transformation instruction input unit 13 by moving the mouse pointer over the display area and making a mouse click at a position of desired coordinates.

More specifically, when using the perspective transforming function of the apparatus, the operator may judge rough ridges in the neighborhood of an area under attention, in which the operator desires to observe the ridges and feature point positions more clearly, and instruct the perspective transformation instruction input unit 13, via the instruction screen as shown in FIG. 3, parameter data for rotating the image to bring the ridges to be vertical and further tilting the image by an adequate angle.

The perspective transforming unit 14 generates perspective transformed image f(x', y') expressed by the formula (1) by executing the affine transformations according to the data of two parameters fed from the perspective transformation instruction input unit 13. In the actual process, each point (x, y) of the original image is obtained by substituting each point (x', y') of the perspective transformed image into formula (2) of inverse conversation to the formula (1), i.e., $$\begin{pmatrix} x \\ y \end{pmatrix} = \begin{pmatrix} \cos\theta & \sin\theta \\ -\sin\theta & \cos\theta \end{pmatrix} \begin{pmatrix} 1 & 0 \\ 0 & 1/r \end{pmatrix} \begin{pmatrix} x' \\ y' \end{pmatrix} \quad (2)$$

The point (x, y) is usually specified by real number coordinates. Thus, four lattice points in the proximity of thus point in the original image, i.e., (int(x), int(y)),
(int(x)+1, int(y)),
(int(x)+1, int(y)+1) and
(int(x), int(y)+1), and also the image densities of the four points, i.e., f(int(x), int(y)),
f(int(x)+1, int(y)),
f(int(x)+1, int(y)+1) and
f(int(x), int(y)+1), are obtained. A weighted mean f(x', y') of these image densities is then taken in correspondence to the distance between point (x', y') and the corresponding point (x, y). int(x) as a function that the decimal fraction of real number x is discarded to provide an integral number.)

Figure 4:
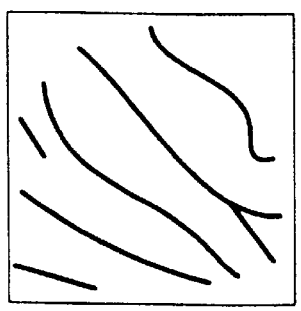
FIG. 4 shows reference images arranged side by side produced from the original image and the perspective transformation.
Figure 4:
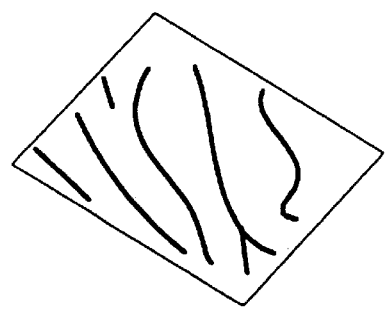

The perspective transformed image display 15 displays the perspective transformed image obtained in the perspective transforming unit 14 to the operator. It is thought that the perspective transformed image, when displayed aside the original image on the display screen of the image display 12, makes the effect of the perspective transformation clearer and is useful for accurate recognition of ridges and feature points by the operator. The display image is shown in FIG. 4.

The operator does operations of manual plotting and manual tracing by moving a mouse pointer on the image displayed on the image display 12 with the perspective transformed image displayed on the perspective transformed image display 15 as reference image, and the result of the operations is inputted to and recorded in the manual input unit 16. FIG. 4 shows an operating screen, which comprises display areas (1) and (2) arranged side by side, the display area (1) being one in which the original image thereon is displayed for manual plotting and manual tracing, the display area (2) being one in which the perspective transformed image is displayed as reference image. The feature data transforming unit 17 transforms the recorded ridges and feature point position data to feature data (such as the number of ridges crossing a line segment connecting each feature point and each near-by feature point). The feature data thus obtained is used for identification of a person in a skin pattern checker.

In the embodiment as described above, the operator determines a perspective transformation parameter set (θ, r) by moving the mouse on the instruction screen as shown in FIG. 2 and making a click when the mouse pointer comes to a desired point. That is, a single perspective transformed image is generated and displayed by starting a perspective transforming operation. However, for enhancing the convenience of the user's operation, it is possible to display successive perspective transformed images following the movement of the mouse caused by the operator in real time with an arrangement that permits the mouse position detection at a sufficiently high sampling rate and image generation for each perspective transformation parameter sample.

While the above embodiment used the mouse as means for inputting data, it is also possible to use a more convenient tool, such as a joy stick, for inputting operator's instructions for enhancing the operation control property and alleviate the operator's burden.

Moreover, while in the above embodiment r is set to be constant, it is also possible to have the value of r dependent on the x–y coordinates.

Figure 5:
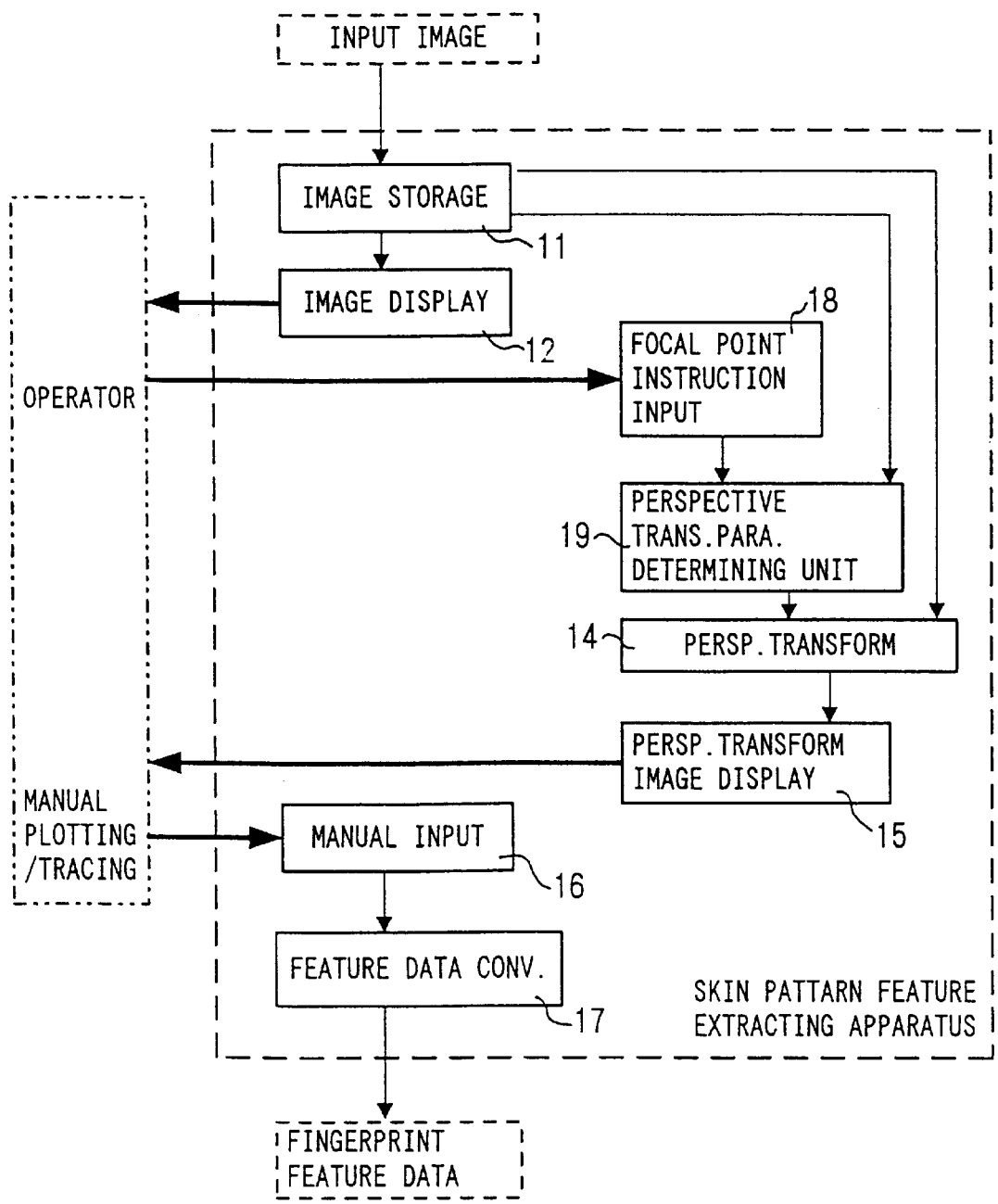
FIG. 5 shows a block diagram of a skin pattern feature extracting apparatus according to a second embodiment of the present invention.

Referring to FIG. 5, a second embodiment of the skin pattern extracting apparatus according to the present invention is shown. This embodiment comprises a focal point instruction input unit 18 and a perspective transformation parameter determining unit 19 in lieu of the perspective transformation instruction input unit 13 in the first embodiment. The focal point is an operator's focal point, operator's center of attention, at which the specification of perspective transformation is determined.

The image storage 11 holds digitized input image.

The image display 12 displays the held input image on its display screen viewed by the operator.

The operator, observing the displayed input image, determines a local focal point therein, in which the operator desires to clearly grasp the ridge structure, and instructs that area to the focal point instruction input unit 18. This input may be given by determining the focal point on the image displayed on the image display 12, moving the mouse pointer to the center of that area and clicking the mouse. With this instruction input, the focal point instruction input unit 18 feeds the instructed position data to the perspective transformation parameter determining unit 19.

The perspective transformation parameter determining unit 19, receiving the instructed position data, determines perspective transformation parameter data for effectively clarifying the structure of ridges in the local image area. The direction of the ridges in the local image area may be determined, and the rotation angle θ of the perspective transformation may be determined such as to change the obtained ridges direction to the vertical direction.

The direction of the local ridges in the skin pattern image may be determined in a method described in Japanese Patent Laid-Open Publication No. 8-7079 entitled "Apparatus for extracting ridges". In this method, by utilizing the fact that the image density slope and the ridge direction cross each other, the density slope vector at each point on image is calculated from proximity image densities, and the direction crossing the main axis direction of the density slope vector distribution is determined to be the ridge direction.

The compression ratio r of the geometrical image compression, may be determined under an assumption that minute ridge structure may easily be observed even if compressed with large compression rate when the image is clear and has less noise. Specifically, r may be determined in a range of ¾ to ¼ and in inverse proportion to the reliability of determining the direction of the local image area ridges. The reliability may be determined by a method described in the Japanese Patent Laid-Open Publication No. 8-7097, that is, it may be determined by using the "reliability of ridge direction" obtained from peculiar value of a variance covariance matrix of the local image area density slope vector distribution. It is possible to obtain perspective transformation corresponding to the ridge quality of the local image area by reducing r if the reliability is too high and increasing r (approaching to 1) if the reliability is too low.

In the manners as described above, the perspective transformation parameter determining unit 19 determines the rotation angle θ and compression ratio r as parameters of the perspective transformation, and the perspective transforming unit 14 executes corresponding to affine transformations. The computation involved is the same as described before in connection with the first embodiment.

That is, denoting the density distribution of the original image by f(x, y) (0≦x<x, 0<y<Y), X and Y being the image sizes in X and Y directions), after the affine transformations of rotating image (x, y) by angle θ and then vertically compressing the resultant image by ratio r, the coordinates (x', y') of the resultant images are expressed as $$\begin{pmatrix} x' \\ y' \end{pmatrix} = \begin{pmatrix} 1 & 0 \\ 0 & r \end{pmatrix} \begin{pmatrix} \cos\theta & -\sin\theta \\ \sin\theta & \cos\theta \end{pmatrix} \begin{pmatrix} x \\ y \end{pmatrix} \quad (3)$$

The perspective transformation image display 15 displays the perspective transformed image obtained in the perspective transforming unit 14 to the operator. It is thought that the perspective transformed image, when displayed aside the image displayed on the image display 12, clarifies the effect of the perspective transformation, and is helpful for accurate recognition of the ridges and feature point positions by the operator.

With the perspective transformed image displayed on the perspective transformed image display 15 as reference image, the operator does operations of manual plotting and manual tracing by moving in the mouse pointer on the image displayed on the image display 12. The feature data transforming unit 17 transforms the recorded ridges and feature point position data to feature data (for instance). The feature data thus obtained is used in a skin pattern checker for identifying a person.

In the above embodiment, the operator instructs a point on the displayed original image, and the perspective transformation parameter determining unit 19 determines the perspective transformation parameters from a local image area centered on the instructed point for displaying an image obtained by the corresponding perspective transformation. However, it is desirable that if the perspective transformation according to the automatically determined parameters is not what is desired by the operator, the operator can instruct new perspective transformation parameters for obtaining perspective transformation once again. To this end, the perspective transformation instruction input unit 13 as in the first embodiment may be provided in the second embodiment, so that its function can be used by the operator for inputting parameters by his or her own decision.

While two embodiments of the present invention have been described, they are by no means limitative, and various changes and modifications may be made without departing from the scope and spirit of the invention.

For example, while in the above embodiments the original image displayed as shown in FIG. 4 has not been subjected to perspective transformation, if providing rotation of the original image and the input image by the same angle θ as the reference image facilitates finding corresponding points on the left and right images and is convenient for the operator's data input, an affine transformation mechanism may be provided which causes rotation of the input image by the same angle of rotation used in the perspective transformation, for displaying the resultant image as the input image.

Figure 6:
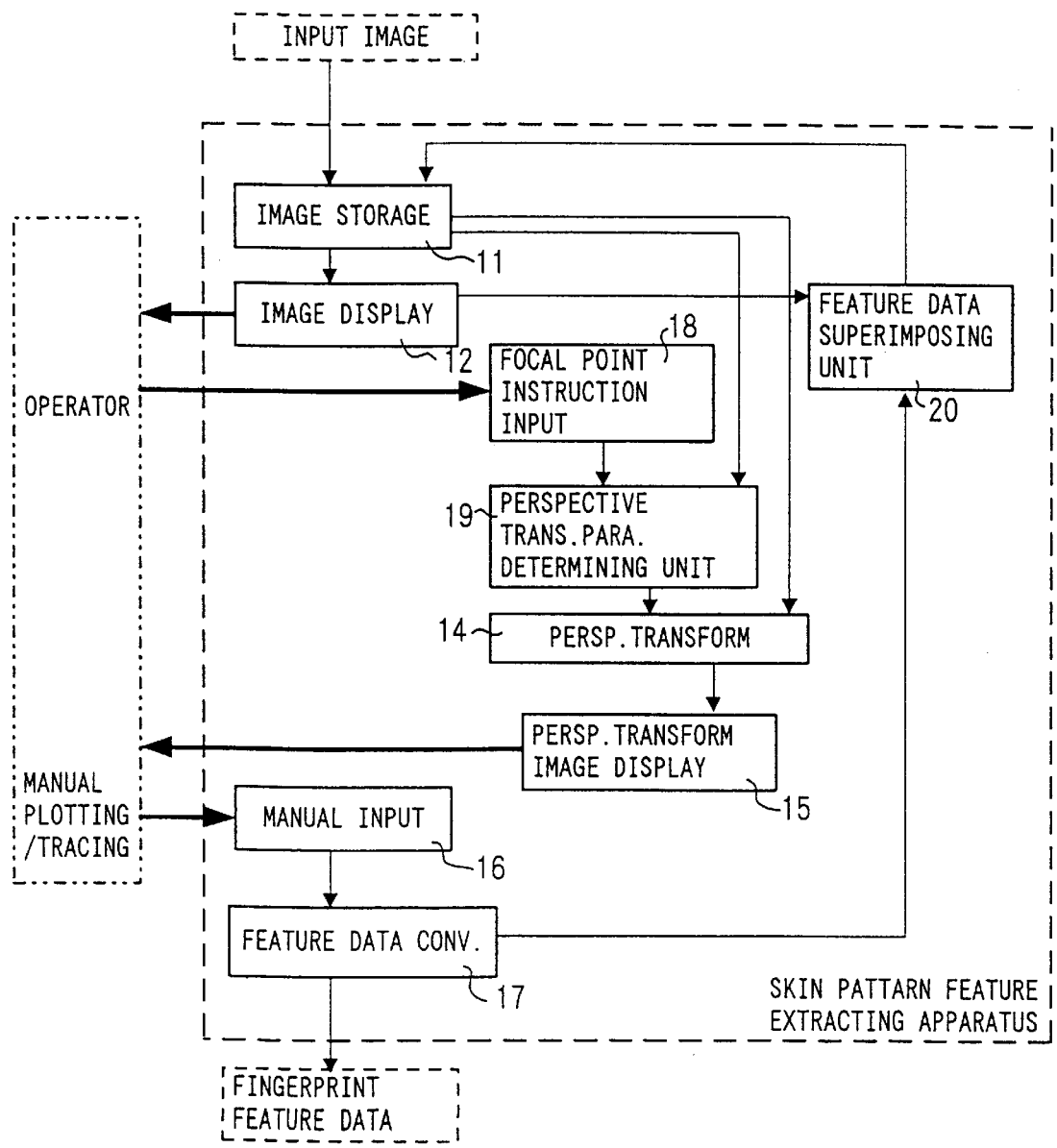
FIG. 6 shows a block diagram of a skin pattern feature extracting apparatus according to a third embodiment of the present invention.
Figure 7:
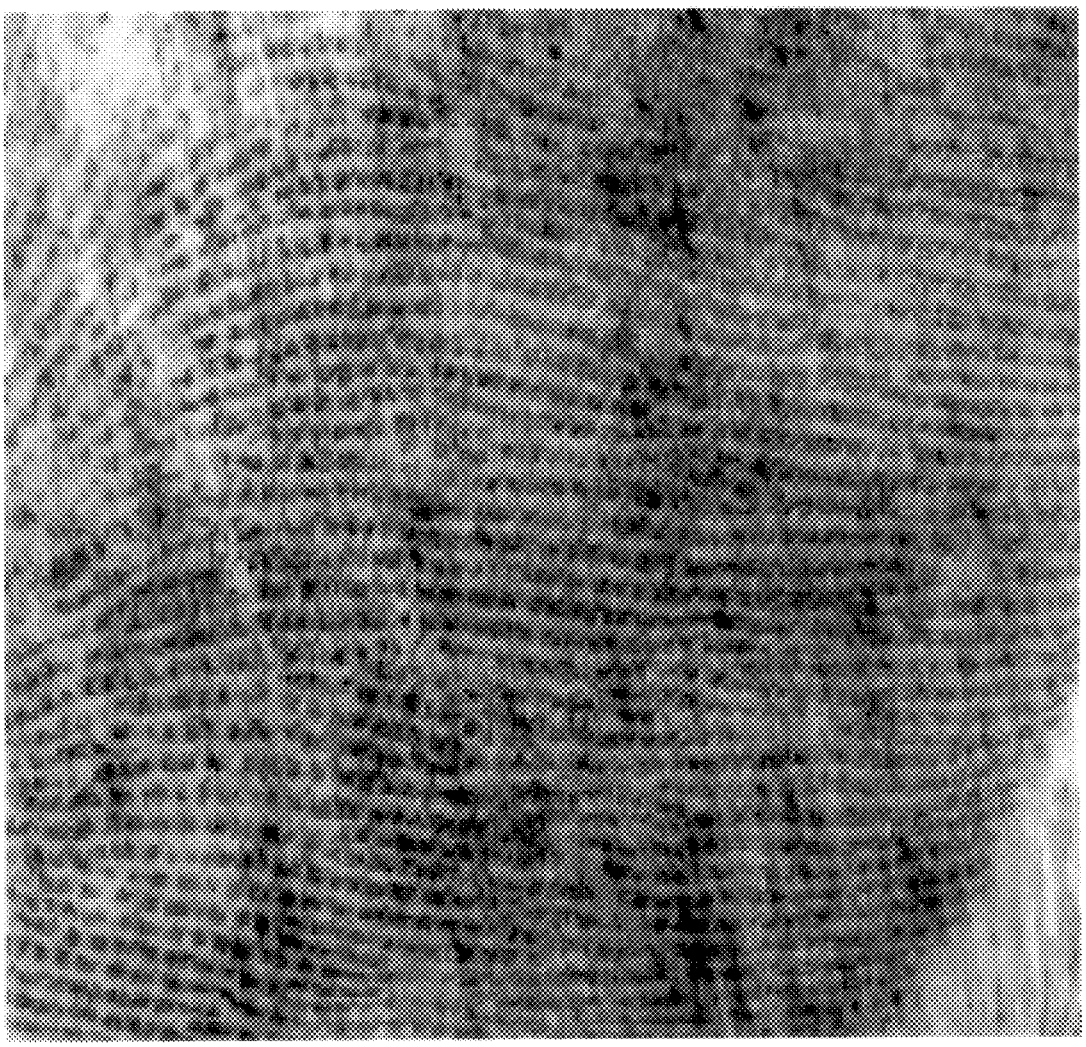
FIG. 7 shows an image before inputting to the skin pattern feature extracting apparatus.
Figure 8:
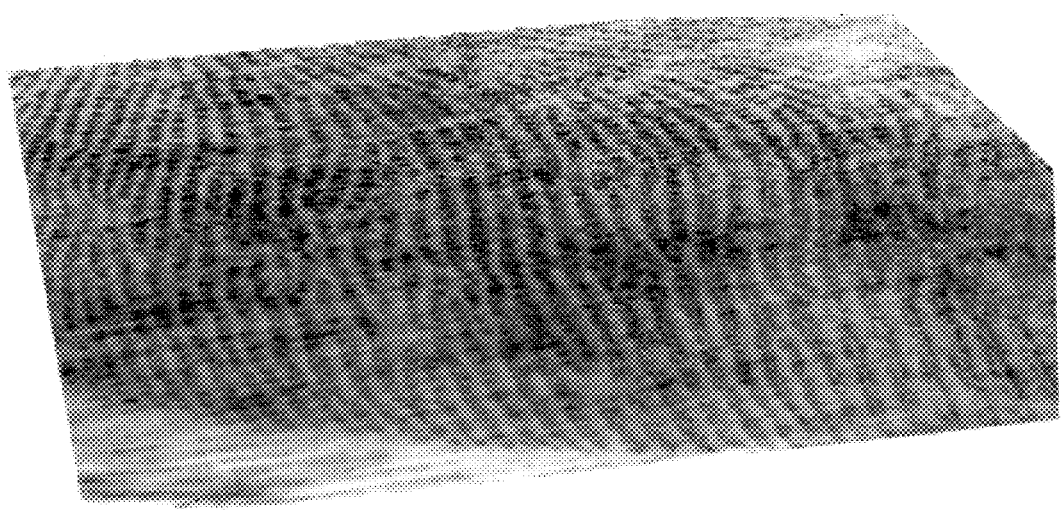
FIG. 8 shows an image produced through the perspective transformation of the skin pattern feature extracting apparatus with the input image of FIG. 7.

Furthermore, it is possible to display such feature data as positions of ridges and positions of end points and bifurcations, recorded in the feature data transforming unit 17 (which data may include those obtained as a result of automatic processing and those manually inputted by the operator), in superimposition on the original image for reference in the next operation. Referring to FIG. 6, a third embodiment of the skin pattern feature extracting apparatus is shown, which realizes the above feature data superimposition.

The embodiment comprises a feature data superimposing unit 20. The feature data superimposing unit 20 displays, as feature data, ridges in the form of curves and end points and bifurcations in the form of circles ○ or crosses X in superimposition on the original image. It is further possible to subject the image thus obtained to further perspective transformation to obtain a reference image displayed to the operator.

As has been described in the foregoing, according to the present invention a given image is perspective transformed according to operator's instructions, and the result is displayed. It is thus possible to improve the accuracy of recognition of ridges which are difficult to recognize in the case of low quality original images, thus improving the accuracy of identifying persons.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A skin pattern feature extracting apparatus for displaying skin pattern images and assisting an operator to input their features, comprising:

perspective transformation instruction input means for inputting operator's perspective transformation instructions thereto, wherein the perspective transformation instructions comprise parameter data corresponding to an inclination angle, $\phi$, and a rotation angle, $\theta$, of a given image, and wherein the perspective transformation uses affine transformations for permitting clearer observation of the structures of a skin pattern, a first affine transformation rotating the given image by the angle $\theta$, resulting in an image where a direction of ridges appearing in the given image are transformed from a horizontal direction to a vertical direction, a second affine transformation compressing the resulting image in the a vertical, Y, direction by $r=\cos \theta$, $0<r<1$), where r is a compression ratio;

perspective transforming means for executing perspective transformation on a given skin pattern image according to the inputted instructions; and perspective transformed image displaying means for displaying the result of the perspective transformation of the skin pattern image to the operator.

2. The skin pattern feature extracting apparatus according to claim 1, which further comprises feature data superimposing means for superimposing, on an original image, data of a set of features automatically or manually extracted from the original image wherein the set of features represent ridges, end points and bifurcations, each feature type represented by a selected symbol.

3. A skin pattern feature extracting apparatus for displaying skin pattern images and assisting an operator to input their features, comprising:

focal point instruction input means for inputting operators focal point instructions thereto, wherein the focal point instructions comprise a selected focal point within a 2-dimensional coordinate system used for displaying the skin pattern image;

perspective transformation parameter determining means for determining the specification of perspective transformation from the characteristics of an input image in the proximity of the instructed focal point; and perspective transformation of the determined specification, wherein the perspective transformation parameter determining means determines an angle $\theta$ of geometrical rotation in the perspective transformation, and/or an extent of geometrical image compression in the perspective transformation with reference to an instructed local image as input;

perspective transforming means for executing affine transformation operations on the input image according to the rotation angle $\theta$ and compression extent r determined by the perspective transformation parameter determining means, wherein the perspective transformation uses affine transformations for permitting clearer observation of the structures of a skin pattern, a first affine transformation rotating the given image by the angle $\theta$, resulting in an image where a direction of ridges appearing in the given image are transformed from a horizontal direction to a vertical direction, a second affine transformation compressing the resulting image in the a vertical, Y, direction by $r=\cos \theta$, $0<r\leq 1$.

4. A skin pattern feature extracting apparatus comprising:

image storage means for storing digitized input image of a skin pattern;

image display means for displaying the input image stored in the image storage means on a display screen;

perspective transformation instruction input means for inputting an instruction of a desired perspective transformation of the displayed image, wherein the perspective transformation instructions comprise parameter data corresponding to an inclination angle, $\phi$, and a rotation angle, $\theta$, of a given image;

perspective transforming means for generating perspective transformed image by executing an affine transformation according to the data fed from the perspective transformation instruction input means;

perspective transformed image display for displaying the perspective transformed obtained in the perspective transforming means;

manual input means, through manual plotting or manual tracing with reference to the perspective transformed image displayed on the perspective transformed image display, for inputting specified position feature data determined based on the manual plotting or manual tracing result; and feature data transforming means for transforming the specified position feature data to feature data for identification of a person in a skin pattern matching.

5. The skin pattern feature extracting apparatus according to claim 4 further comprising a feature data superimposing unit for superimposing on the input image a symbol.

6. A skin pattern feature extracting apparatus comprising:

image storage means for storing digitized input image of a skin pattern;

image display means for displaying the input image stored in the image storage means on a display screen;

focal point instruction input means for inputting position data of a local focal point, wherein the local focal point is within a 2-dimensional coordinate system used for displaying the skin pattern image;

perspective transformation parameter determining means, receiving the position data from the focal point instruction means, for determining perspective transformation parameter data for effectively clarifying the features of the local image area, wherein the perspective transformation parameter data comprise parameter data corresponding to a rotation angle, $\theta$, and compression extent r of a given image;

perspective transforming means for generating perspective transformed image by executing an affine transformation according to the data fed from the perspective transformation parameter determining means;

perspective transformed image display for displaying the perspective transformed obtained in the perspective transforming means;

manual input means, through manual plotting or manual tracing with reference to the perspective transformed image displayed on the perspective transformed image display, for inputting specified position feature data determined based on the manual plotting or manual tracing result;

feature data transforming means for transforming the specified position feature data to feature data for identification of a person in a skin pattern matching; and feature data superimposing unit for superimposing symbols on the input image, each symbol representing a skin pattern feature selected from the group of ridges, end points and bifurcations.

7. A method for extracting skin pattern features from an image, said method comprising the steps of:

retrieving a stored digitized input image of a skin pattern;

inputting an instruction of a desired two-dimensional perspective transformation of the displayed image, wherein the perspective transformation instruction comprises parameter data corresponding to a rotation angle, θ;

generating a perspective transformed image by executing an affine transformation according to data input in the inputting step, wherein the perspective transformation uses affine transformations for permitting clearer observation of the structures of a skin pattern, a first affine transformation rotating the given image by the angle θ, resulting in an image where a direction of ridges appearing in the given image are transformed from a horizontal direction to a vertical direction, a second affine transformation compressing the resulting image in the a vertical, Y, direction by r=cosθ, 0<r≦1, where r is a compression ratio; and displaying the perspective transformed image obtained in the generating step on a display screen.

8. A method as recited in claim 7, further comprising the steps of displaying the stored digitized input image on the display screen simultaneously with the displayed image of the perspective transformed image;

extracting data of a set of features from the input image, wherein the perspective transformed image is superimposed on the stored digitized input image on the display screen, and wherein the set of extracted features represent ridges, end points and bifurcations, each feature type represented by a selected symbol on the display screen.

9. A method as recited in claim 8, further comprising the steps of:

one of manual plotting or manual tracing with reference to the perspective transformed image displayed on the image display, for inputting specified position feature data determined based on the manual plotting or manual tracing result to be stored; and transforming the stored specified position feature data to feature data for identification of a person in a skin pattern matching.

\* \* \* \* \*